Patented Oct. 16, 1934

1,976,780

UNITED STATES PATENT OFFICE 1,976,780

INSECTICIDAL COMPOSITION

Dudley H. Grant, Berkeley Heights, N. J., assignor to Stanco, Incorporated, a corporation of Delaware No Drawing. Application June 11, 1931, Serial No. 543,740

3 Claims. (Cl. 167—27)

Petroleum oil spray insecticides have been used in increasing quantities during recent years, notwithstanding the fact that they are frequently harmful to trees and other plants, especially during the growing season.

Various investigations have shown that the harmful effects of petroleum oils on plants are due to penetration of the oil into the stomata of the leaf, into the joints of the petioles and perhaps even into the cells of the leaf tissue. Among such investigations may be cited those of E. R. De Ong: Progress Report on the Use of Petroleum Oil as an Insecticidal Spray: Jour. of Economic Entomology, vol. 21, p. 525 (Aug. 1928), and of J. M. Ginsburg: What Summer Oil Sprays May Do to Apple Trees: same journal, vol. 24, p. 283 (Feb. 1931).

Various efforts have been made to obviate or mitigate these harmful effects of oil penetration. The use of very highly refined oils such as Petrolatum Liquidum, U. S. P. has been found less dangerous than that of ordinary lubricating oils, probably not because penetration has been lessened but because the toxicity of the oil to the plant cells after penetration has been somewhat reduced. De Ong (loc. cit.) suggests the use of more volatile oils, in the hope that the oil may evaporate from the leaf surface before much penetration has occurred. Ginsburg (loc. cit.) recommends the use of more viscous oils than those customarily employed, naming "Nujol" and "Primol Heavy", which are highly refined "white oils" of 220 and 320 viscosity (Saybolt).

I have found that penetration of petroleum oil into plant tissues can be greatly reduced, without much loss of insecticidal power, by the addition of certain waxes and/or refined petrolatum to the oil, in such combinations and quantities as to render the oil solid at ordinary summer temperatures. It is not sufficient merely to render the oil solid by adding waxes, etc., for if the compound be of too hard or tough a consistency, its insecticidal power will be seriously impaired, owing to the lack of effective contact between it and the bodies of insects crawling over the leaves. The essential point of my invention lies in the production of a gel of wax-petrolatum in oil, having a melting point over 90° F. but having so delicate a jelly-like structure that it breaks down temporarily into liquid oil when mechanically disturbed and then gels again. Such gels are analogous to the alcohol-soap gels used, for example, as canned fuel, which melt at a fairly high temperature but become liquid if rubbed.

By careful attention to the character and proportions of the constituents, it is possible to make oil-wax gels which are solid at temperatures up to 90°, 100°, 110° F. or even higher, and which suffer little or no syneresis or oozing of liquid oil when exposed for some time, but which, when touched even very lightly, temporarily release oil and adhere to the object with which they come in contact. Such compounds, when sprayed in emulsified form upon plants, do not immediately spread over the entire leaf surface as do liquid oils, thereby interfering seriously with leaf respiration and transpiration and offering maximum opportunity for penetration into the tissues, but, in contrast to these, remain spattered more or less finely over the leaf surface in discrete spots, the dimensions of which depend upon the emulsifier and spray equipment used. While the interference with leaf function doubtless occurs beneath each of these spots of oil-wax gel, the area affected is much less than in the case of liquid oils, and the consequent risk of plant injury is reduced.

The insecticidal effect of these compounds, while not always quite equal to that of an equivalent quantity of liquid oil, is not reduced in so great a proportion as the plant injury. This is owing to the fact that most insects against which oil sprays are applied customarily move about to some little extent upon the leaf surface, thereby inevitably coming into contact with particles of the oil-wax gel and becoming coated with the liquid oil released by it when disturbed. This is notably true in the case of the larvae of the codling moth, the adults of the red spider, aphids and several other insects of economic importance.

In making oil-wax gels of the kind specified above, I prefer to use highly-refined petroleum oil, the safest variety being the so-called "white oils", also known as medicinal or cosmetic oils, of which one is Petrolatum Liquidum, U. S. P. In practice, however, an oil of lower viscosity than that of Petrolatum Liquidum is useful and more economical. Refined mineral oils having a viscosity of from 45 to 300 seconds Saybolt at 100° F. are used in my invention and preferably such oils of viscosity from 56 to 220 seconds Saybolt at 100° F. With this oil are combined highly-refined petrolatum or "essence of petrolatum", which is an amorphous wax of high melting point obtained from certain lubricating oils, and having a very pale color, almost water-white, as well as refined paraffin, ceresin, ozokerite, beeswax, carnauba wax, stearic acid, candelilla wax, Montain wax and any other combination of waxes or wax-like substances which will impart to the oil a solid consistency with melting point above 90° F. and a gel structure easily broken down by mechanical disturbance. The amount of wax added to the oil varies with the consistency required but is usually not less than 5 and not more than 40% of the oil-wax mixture. 15 to 30% of wax gives most suitable composition. For purposes of emulsification with water for use in the field as an insecticide, I furthermore add any suitable emulsifying agent, such as oil-soluble sulfonate soaps made by neutralization of acid-treated petroleum; ordinary fatty soaps; sulfonated vegetable or animal oils, fatty acids or their soaps; triethanolamine soaps, rosin soaps, inert colloids such as caseinates, skim milk powder, glue, gums or dextrin, alginates, saponin, albumins, etc.

Examples of such compounds, suitable for emulsification with water for spraying on plants, are the following:

*Example 1 (Stock emulsion)*

| | |
|---|---|
| Beeswax | 4 lbs. |
| Refined paraffin wax | 10 lbs. |
| Essence of petrolatum | 3 lbs. |
| White oil | 10 gallons |
| Stearic acid | 10 lbs. |
| Triethanolamine | 5 lbs. |
| Water | 7½ gallons |

(to be diluted with water to make 50 to 200 gallons of spray)

*Example 2 (Stock emulsion)*

| | |
|---|---|
| Ozokerite, refined | 10 lbs. |
| White oil, 80 viscosity | 5½ gals. |
| Stearic acid | 10 lbs. |
| Triethanolamine | 5 lbs. |
| Water | 3¾ gals. |

*Example 3*

| | |
|---|---|
| Oil-soluble sodium sulfonate (from white oil treat) | 20 lbs. |
| High melting point wax | 3 lbs. |
| Refined parafin | 10 lbs. |
| White oil | 8½ gals. |

(To be emulsified with 40–150 gal. water for use)

*Example 4 (Stock emulsion)*

| | |
|---|---|
| Potassium oleate | 14 lbs. |
| Essence of petrolatum | 4 lbs. |
| Refined parafin wax | 11 lbs. |
| White oil | 5 gals. |
| Water | 3 gals. |

*Example 5 (Stock emulsion)*

| | |
|---|---|
| Beeswax | 8 lbs. |
| Refined paraffin wax | 7 lbs. |
| Skimmed milk powder | 5 lbs. |
| White oil | 6½ gals. |
| Water | 3¾ gals. |
| Preservative and ammonia | q. s. |

Throughout the specification and in the following claims the expression "wax" is meant to include waxes proper as well as other wax-like substances, such as those mentioned before, and also petrolatum of high melting point which is an amorphous wax-like material.

My invention is not to be limited by any theory or example given by way of illustration but only by the following claims in which it is my intention to claim all novelty inherent in the invention.

I claim:

1. As an insectidical composition an oil wax gel comprising refined mineral oil and a wax and having a melting point above 90° F., said composition being capable of breaking down readily under friction to liberate the insecticidal oil.

2. As an insecticidal composition an oil wax gel comprising 95 to 60% of refined mineral oil and 5 to 40% of wax.

3. As an insecticidal composition an oil wax gel comprising 85 to 70% of refined mineral oil and 15 to 30% of wax.

4. As an insecticidal composition an oil wax gel comprising 95 to 60% of white oil and 5 to 40% of wax.

5. The composition according to claim 1 with the further addition of an emulsifying agent and water.

6. The composition according to claim 2 with the further addition of an emulsifying agent and water.

7. The composition according to claim 3 with the further addition of an emulsifying agent and water.

8. The composition according to claim 4 with the further addition of an emulsifying agent and water.

DUDLEY H. GRANT.